US009292982B1

(12) United States Patent
Higgs et al.

(10) Patent No.: US 9,292,982 B1
(45) Date of Patent: Mar. 22, 2016

(54) SYSTEMS AND METHODS FOR MOBILE MILEAGE TRACKING

(71) Applicant: STATE FARM MUTUAL AUTOMOBILE INSURANCE COMPANY, Bloomington, IL (US)

(72) Inventors: Joe Higgs, Plantation, FL (US); Corly Leung, Milpitas, CA (US); Natalie Nelson, Bloomington, IL (US); Ryan Hoffman, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/854,462

(22) Filed: Sep. 15, 2015

(51) Int. Cl.
*G07C 5/08* (2006.01)
*G09G 5/00* (2006.01)
*G07C 5/00* (2006.01)

(52) U.S. Cl.
CPC ................ *G07C 5/085* (2013.01); *G07C 5/008* (2013.01); *G09G 5/003* (2013.01); *G09G 2370/16* (2013.01)

(58) Field of Classification Search
USPC ........................................................ 701/32.5
See application file for complete search history.

(56) References Cited

U.S. PATENT DOCUMENTS 5,550,738 A * 8/1996 Bailey .................... G07C 5/085 340/459
6,064,929 A * 5/2000 Migues ................ G06Q 10/047 701/1
6,856,933 B1 * 2/2005 Callaghan ............. G01C 22/02 702/122
6,988,033 B1 * 1/2006 Lowrey .................... G08G 1/20 340/439
7,876,205 B2 * 1/2011 Catten .................... H04K 3/415 180/271
8,655,544 B2 * 2/2014 Fletcher ................ G01S 5/0072 701/32.5
9,142,142 B2 * 9/2015 Nath ...................... G07C 5/008
2004/0064247 A1 * 4/2004 Davis ..................... G07B 15/02 701/533
2013/0226366 A1 * 8/2013 Biondo ................. G07C 5/085 701/1

* cited by examiner

*Primary Examiner* — Jason Holloway
(74) *Attorney, Agent, or Firm* — Marshall, Gerstein & Borun LLP; Randall G. Rueth

(57) ABSTRACT

A system and method allows a user to connect a mobile device, such as a smartphone, to a vehicle in order to track and record driving mileages incurred for a trip. Once a connection is established, the system and method automatically begins mileage tracking. Upon termination of the connection, the system and method sums up the tracked mileages to calculate a total mileage for the trip. The system and method then displays the total mileage for the trip to the user.

25 Claims, 4 Drawing Sheets

SYSTEMS AND METHODS FOR MOBILE MILEAGE TRACKING

TECHNICAL FIELD

The present application relates generally to mileage tracking and, more specifically, to systems and methods for automatically tracking driving mileages using mobile devices.

BACKGROUND

Individuals may wish to track and report the number of miles that they drive on a regular basis for tax or reimbursement purposes. Traditional methods of mileage tracking involve either writing down the number of miles driven in a log book or inputting the miles into a software program such as a spreadsheet application. Either way, the tracking and recording of mileage information is, by and large, a manual effort. As a result, traditional methods of mileage tracking can be tedious and inconvenient to use, which in turn cause users to procrastinate or forget to record their miles in a timely manner. Consequently, many users are forced to later recall or estimate their miles leading to incorrect or inaccurate reporting.

To better facilitate the process of tracking and recording mileages, various mobile solutions have been proposed. For example, mobile applications have been developed that allow users to start and stop mileage tracking by pressing a few buttons. Other examples include allowing users to operate mobile versions of existing mileage tracking software programs. However, most, if not all, of these mobile solutions are still manually operated and are thus still tedious to use or prone to human errors. Hardware solutions, on the other hand, may offer higher accuracy by making sure that every mile is properly recorded. However, the deployment of any hardware solution entails extra costs in terms of equipment, physical installation, management and other administrative expenses.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for automatic mileage tracking using a mobile device may include configuring, by using one or more processors of the mobile device, a set of trip categorization rules. The method may also define, by using one or more processors of the mobile device, a trip type for a current trip based on the set of trip categorization rules. Further, the method may establish, by using one or more processors of the mobile device, a wireless connection between the mobile device and a vehicle. In response to establishing the wireless connection between the mobile device and the vehicle, the method may execute, by using one or more processors of the mobile device, mileage tracking for the current trip. Upon termination of the wireless connection between the mobile device and the vehicle, the method may store, by using one or more processors of the mobile device, a plurality of tracked mileages from the mileage tracking for the current trip in a memory of the mobile device. The method may then calculate, by using one or more processors of the mobile device, a total mileage for the current trip by summing the plurality of tracked mileages. Finally, the method may display, by using one or more processors of the mobile device, the total mileage for the current trip to a user.

A non-transitory computer-readable storage medium may comprise computer-readable instructions to be executed on one or more processors of a mobile device for automatic mileage tracking. The instructions when executed, may cause the one or more processors to configure a set of trip categorization rules. The instructions when executed, may also cause the one or more processors to define a trip type for a current trip based on the set of trip categorization rules. Further, the instructions when executed, may cause the one or more processors to establish a wireless connection between the mobile device and a vehicle. In response to establishing the wireless connection between the mobile device and the vehicle, the instructions when executed, may cause the one or more processors to execute mileage tracking for the current trip. Upon termination of the wireless connection between the mobile device and the vehicle, the instructions when executed may cause the one or more processors to store a plurality of tracked mileages from the mileage tracking for the current trip in the memory of the mobile device. The instructions when executed, may then cause the one or more processors to calculate a total mileage for the current trip by summing the plurality of tracked mileages. Finally, the instructions when executed, may cause the one or more processors to display the total mileage for the current trip to a user.

A system for automatic mileage tracking using mobile devices may comprise a mobile device that includes a memory having instructions for execution on one or more processors. The instructions when executed by the one or more processors, may cause the mobile device to configure a set of trip categorization rules. The instructions when executed by the one or more processors, may also cause the mobile device to define a trip type for a current trip based on the set of trip categorization rules. Further, the instructions when executed by the one or more processors, may cause the mobile device to establish a wireless connection between the mobile device and a vehicle. In response to establishing the wireless connection between the mobile device and the vehicle, the instructions when executed by the one or more processors, may cause the mobile device to execute mileage tracking for the current trip. Upon termination of the wireless connection between the mobile device and the vehicle, the instructions when executed by the one or more processors, may cause the mobile device to store a plurality of tracked mileages from the mileage tracking for the current trip in the memory of the mobile device. The instructions when executed by the one or more processors, may then cause the mobile device to calculate a total mileage for the current trip by summing the plurality of tracked mileages. Finally, the instructions when executed by the one or more processors, may cause the mobile device to display the total mileage for the current trip to a user.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, the disclosed system allows users to connect their mobile devices to their vehicles in order to automatically track and record their driving mileages.

Figure 1:
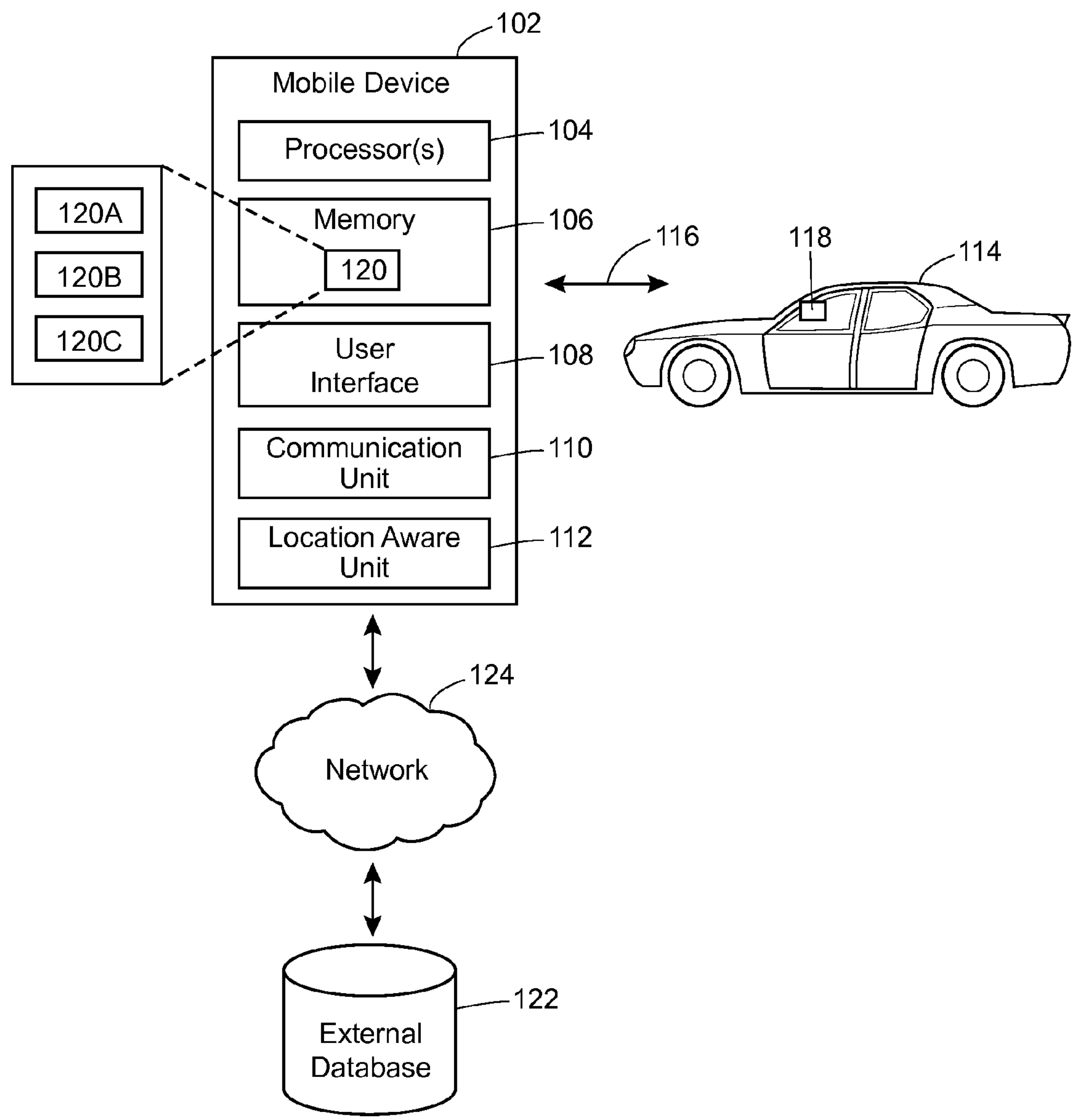
FIG. 1 is a block diagram of an example system for automatically tracking driving mileages using mobile devices.

Referring first to FIG. 1, which is a block diagram of an example system 100 for automatically tracking driving mileages using mobile devices. The example system 100 includes a mobile device 102 having one or more processors 104, a memory 106, a user interface 108 (e.g., a display screen, a touchscreen, a keyboard, etc.), a communication unit 110, and a location aware unit 112. The mobile device 102 may be a smartphone, a tablet computer, a personal digital assistant, a wearable computer, or any other mobile computing device.

To enable automatic tracking of driving mileages, the mobile device 102 may be communicatively connected to a vehicle 114 (e.g., a car). In particular, the mobile device 102 may use the communication unit 110 to connect to the vehicle 114 over a wireless link 116. Accordingly, the vehicle 114 may be equipped with a matching on-board communication unit 118. The on-board communication unit 118 may be part of a vehicle computer system (not shown) available in the vehicle 114.

In general, the connection between the mobile device 102 and the vehicle 114 involves short range wireless communication. In the embodiment of FIG. 1, short range wireless communication is implemented using Bluetooth, although other technologies (e.g., near field communication (NFC), radio frequency identification (RFID), etc.) can also be used.

When using Bluetooth, the on-board communication unit 118 in the vehicle 114 may transmit a unique identification number (e.g., a media access control (MAC) address associated with the vehicle computer system (not shown) in the vehicle 114) over the wireless link 116. If the mobile device 102 is within range of the transmission, the communication unit 110 may receive the unique identification number and compare that number to a list of stored identification numbers. If a match is found, then the mobile device 102 may identify and connect to the vehicle 114. If desired, new identification numbers can be added to the list of stored identification numbers. This allows the mobile device 102 to identify and connect to new vehicles. Additionally, a user can manually connect the mobile device 102 to a particular vehicle by selecting an identification number associated with the particular vehicle from the list of stored identification numbers.

Once connected, the mobile device 102 may automatically begin tracking of driving mileages. To do so, the mobile device 102 may use the location aware unit 112 to locate the position of the mobile device 102 and hence the position of the vehicle 114. Changes in the position of the mobile device 102 may be tracked to determine the total amount of miles driven by the vehicle 114. In general, the location aware unit 112 may use any suitable location awareness system such as global positioning system (GPS), cellular tower triangulation, Wi-Fi triangulation, etc.

In some embodiments, the mobile device 102 may perform automatic tracking of driving mileages by using a location awareness system in the vehicle 114. For example, the vehicle 114 may be equipped with an on-board GPS unit which can track the position of the vehicle 114 and then relay the tracking information back to the mobile device 102 via the wireless link 116.

In operation, a user may bring the mobile device 102 to the vehicle 114 when the user decides to take a trip. That is, when the user decides to drive the vehicle 114 from one location to another. Generally, a trip starts when the user turns on the vehicle 114, and finishes when the user shuts off the vehicle 114. Accordingly, once the user turns on the vehicle 114, the communication unit 110 of the mobile device 102 may communicate over the wireless link 116 with the on-board communication unit 118 to identify and connect to the vehicle 114 by using, for example, Bluetooth.

When the mobile device 102 is successfully connected to the vehicle 114, the mobile device 102 may automatically commence mileage tracking for the trip. Specifically, the location aware unit 112 in the mobile device 102 may transmit "ping" signals periodically (e.g., every few seconds) to locate the position of the mobile device 102 and hence the position of the vehicle 114 that is connected to the mobile device 102. Each pinged signal is logged and stored in the memory 106 as trip data 120. At the end of the trip, the user shuts off the vehicle 114 and the connection between the mobile device 102 and the vehicle 114 is terminated. Afterward, the mobile device 102 may analyze the trip data 120 in the memory 106 by summing up the distance (or miles driven) between each pinged signal to calculate a total distance (or total number of miles driven) for the trip. In this manner, the mobile device 102 automatically tracks and records driving mileages incurred for the trip.

In some embodiments, the mobile device 102 may analyze the pinged signals during the trip. In other words, instead of calculating the total number of miles driven at the end of the trip, the mobile device 102 may tally up the number of miles as the trip progresses. This may avoid the accumulation of unnecessary pinged signals during vehicle idling times. For example, if the user is stuck in heavy traffic, then the vehicle 114 may travel negligible distances between some successive pinged signals. As such, some of these pinged signals may not be stored as part of the trip data 120 if the mobile device 102 determines that the distance traveled between some of these pinged signals is zero.

Generally speaking, mileage tracking is performed so that the user can properly report mileage information associated with his or her work for tax or reimbursement purposes. As such, most trips for which mileage is tracked may be classified as business trips. However, the user may also undertake certain personal trips. To distinguish between the user's business miles and personal miles, the trip data 120 may be specified in terms of business trip data 120A, personal trip data 120B, and personal incidental trip data 120C. The personal trip data 120B may specify purely personal trips, while the personal incidental trip data 120C may specify personal trips that are caused by work (e.g., commute to and from work).

The mobile device 102 may automatically categorize a given trip and store any tracked driving mileages accordingly. To accomplish this, the user may configure a set of trip categorization rules. For example, the user may define a set of working hours (e.g., between 9 AM and 5 PM) for a work day. Thus, if the user takes a trip during the set of working hours, then the trip may be categorized as a business trip. Accordingly, when the mobile device 102 connects to the vehicle 114 during the set of working hours, any mileages tracked during that time may be stored as part of the business trip data 120A. On the other hand, if the user takes a trip outside the set of working hours, then the trip may be categorized as a personal trip. As such, mileages tracked during times outside the set of working hours may be stored as part of the personal trip data 120B.

Further, the user may define a time period just before and after the set of working hours (e.g., one hour before the start of the work day and one hour after the end of the work day). Any mileages tracked for trips taken during this time period may be assumed to be commute times and thus stored as part of the personal incidental trip data 120C. In some embodiments, tracked mileages for the first and last trip of the day may be stored as part of the personal incidental trip data 120C. Of course, the set of trip categorization rules may be adjusted according to any desired user preferences or requirements (e.g., multiple sets of working hours in a day, specific time periods for personal trips, weekends and holidays, etc.).

During a trip, the user also has the option of splitting the trip. More particularly, the user may end mileage tracking on a current trip and then change the type of trip to begin mileage tracking on a new trip. For example, the user may be undertaking a business trip currently but wishes to take a detour trip for personal reasons. As such, the user may issue a command (e.g., a button press, a voice command, etc.) via the user interface 108, to indicate that the current business trip is to be split into a new personal trip. Upon receiving the command, the mobile device 102 may terminate mileage tracking on the current business trip by saving all the tracked mileages so far as part of the business trip data 120A. The mobile device 102 may then commence mileage tracking on the new personal trip by saving all ensuing tracked mileages as part of the personal trip data 120B.

Alternatively or additionally, for each trip, the user may specify the type of trip before mileage tracking begins for each trip. For example, the user may define a trip to be a business trip before the mobile device 102 is connected to the vehicle 114. Accordingly, any subsequently tracked mileages may be stored as part of the business trip data 120A.

In some embodiments, the mobile device 102 may simply track mileages for each trip and then allow the user to specify the type of trip at a later time. For example, the user may manually categorize each stored trip at the end of each day. This requires some manual effort on the part of the user to remember the purpose of each trip. However, as more and more trips are manually categorized over time, the mobile device 102 may be able to learn how specific types of trips are personally categorized by the user (e.g., by using pattern recognition or adaptive learning algorithms). Thus, based on this learning process, the mobile device 102 may adapt to automatically categorize a given trip and store any tracked driving mileages accordingly.

Figure 2A:
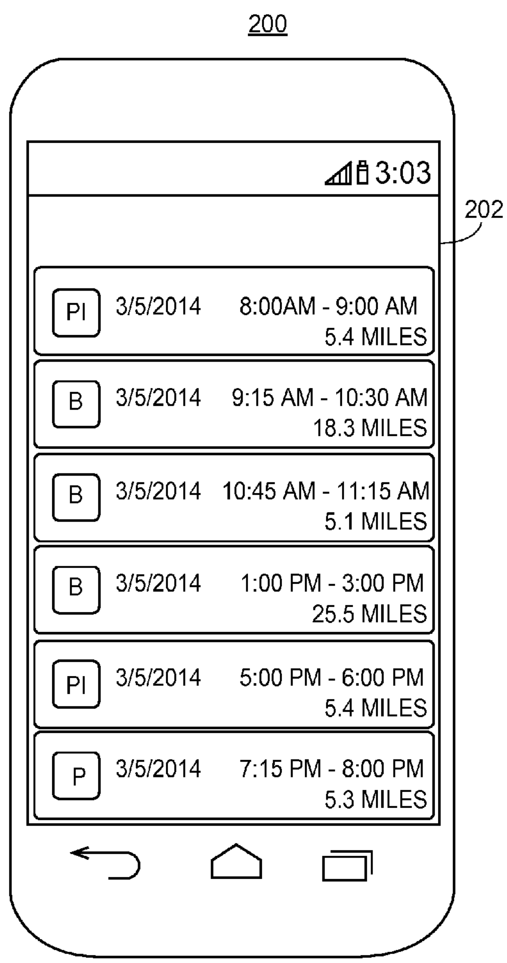
FIG. 2A is a screenshot of an example mobile device displaying tracked driving mileages for various trips.

The user may view any or all of the trip data 120A-120C stored in the memory 106 of the mobile device 102. FIG. 2A is a screenshot of an example mobile device 200 displaying tracked driving mileages for various trips. The example mobile device 200 may be similar to the mobile device 102 of FIG. 1. As such, the example mobile device 200 includes a user interface 202 (similar to the user interface 108) that displays stored trips. As illustrated in FIG. 2A, the stored trips may be displayed in chronological order. Each trip may be labeled as either business (B), personal (P) or personal incidental (PI). Further, each trip label may be color-coded according to the type of trip (e.g., blue for business, red for personal, yellow for personal incidental). For each trip, the total mileage incurred along with the date of the trip and the time duration of the trip are also displayed in the user interface 202.

Figure 2B:
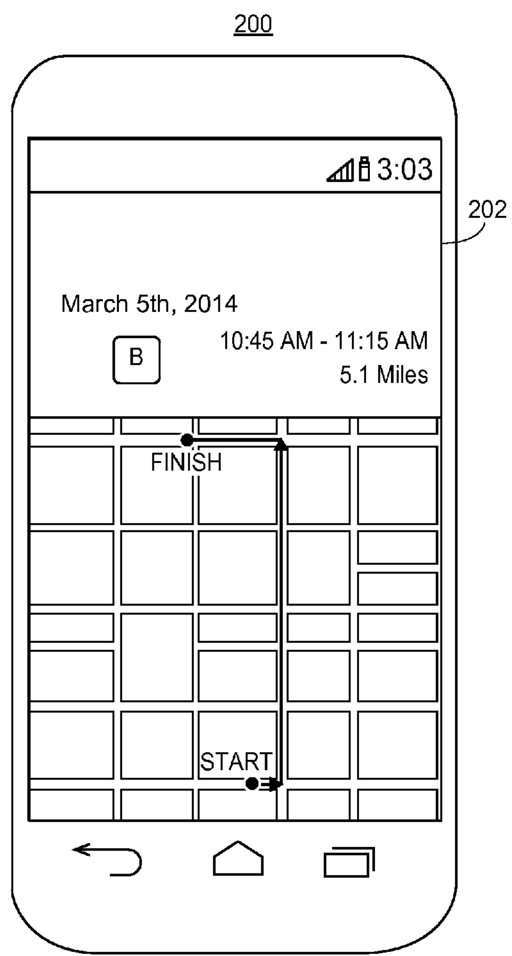
FIG. 2B is a screenshot of an example mobile device displaying a map of a route taken by a particular trip.

The user can manually edit any of the displayed trips in the user interface 202. For example, the user may select a business trip and change the type of trip to a personal trip. This option may allow the user to correct for mistakes or errors. Further, the user may select a trip and view a map of the trip. This is illustrated in FIG. 2B, which shows a screenshot of the example mobile device 200 displaying a map of a route taken by a particular trip from start to finish. This map viewing functionality helps the user to better recognize or remember the particular trip by allowing the user to review the exact route taken by the trip.

With continued reference to FIG. 1, after viewing or reviewing the trip data 120A-120C stored in the memory 106, the user may submit the trip data 120A-120C for reporting purposes. For example, the user may submit the business trip data 120A for tax or reimbursement purposes. Accordingly, the mobile device 102 may transmit any or all of the trip data 120A-120C to a remote or external database 122 via a network 124 (e.g., a local area network, a wide area network, a mobile network, a wired or wireless network, a private network, etc.). Once received, the external database 122 may store and archive the data for further processing.

Submitting trip data entails submitting only the tracked mileages associated with a trip to the external database 122. As such, only mileage numbers are sent and not location information. This helps to maintain the privacy of the user's trip data.

The user may submit any or all of the trip data 120A-120C in the memory 106 on a regular basis (e.g., daily, weekly, etc.). To encourage submission and avoid procrastination, the user may set up an alarm to remind him or her to submit the trip data 120A-120C. For example, the user may define a reminder alarm to go off at the end of each day (e.g., at 7 PM). Thus, if the user has not submitted any data by the end of the day, then the reminder alarm will be activated to remind the user. However, if data was already submitted by the user before the end of the day, then the reminder alarm may not be activated. In some embodiments, if the user does not take any action to submit the trip data 120A-120C even after the activation of the reminder alarm, then the mobile device 102 may automatically submit the trip data 120A-120C. In other embodiments, the mobile device 102 may automatically submit the trip data 120A-120C at the end of each day.

Once data for a trip is submitted, the mobile device 102 may delete the trip from the memory 106. In some embodiments, the mobile device 102 may retain the trip in the memory 106 even after submission. However, the user can no longer edit any submitted trip. The user can also manually delete the trip from the memory 106. In some embodiments, the mobile device 102 deletes all submitted trips from the memory 106 at the end of each day. In some embodiments, the user may use the mobile device 102 to access the external database 122 so that the user can edit any submitted trip data for errors or update any incorrect information.

Figure 3:
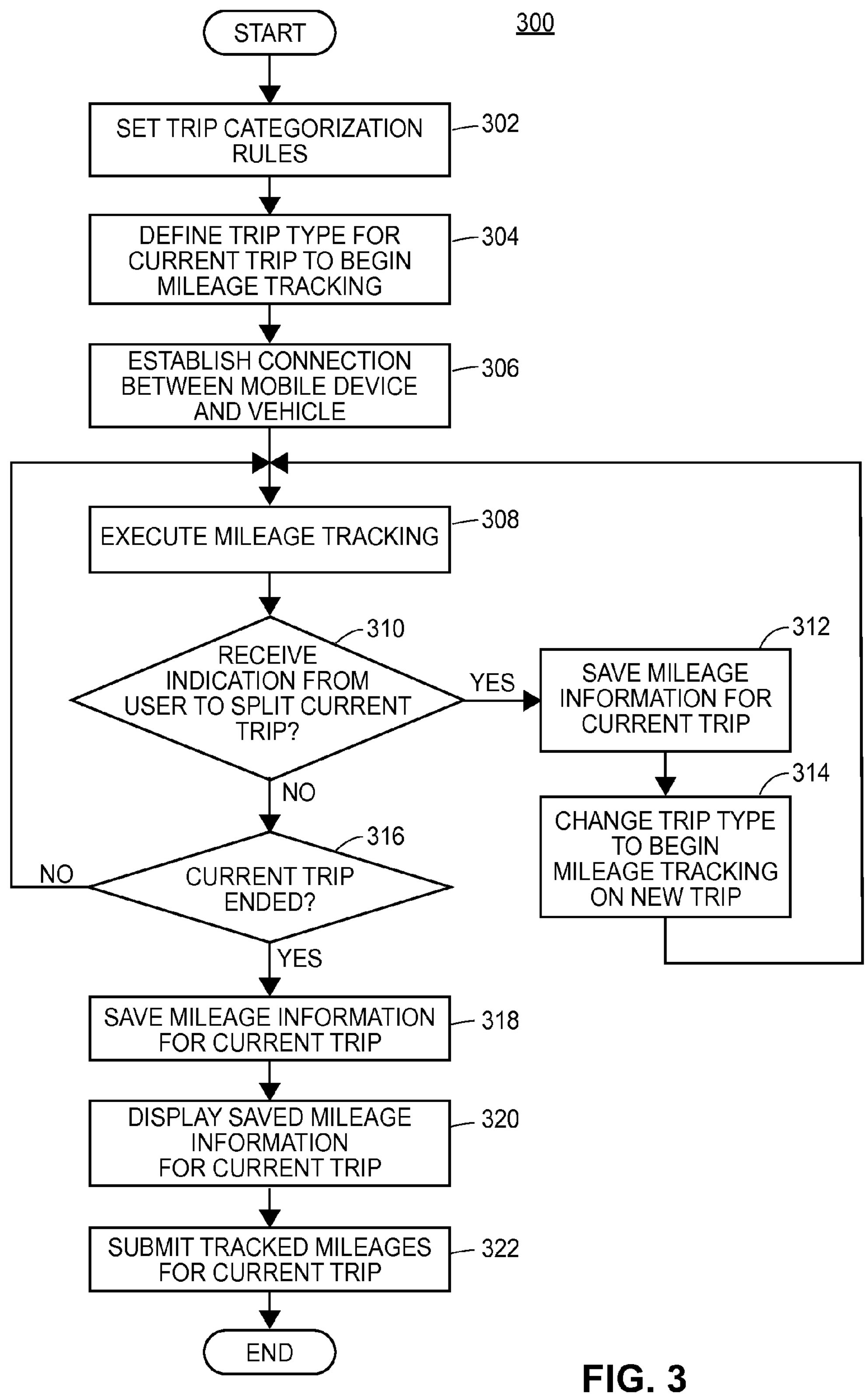
FIG. 3 is a flow diagram of an example method for automatically tracking driving mileages using mobile devices.

Referring now to FIG. 3, which describes a flow diagram of an example method 300 for automatically tracking driving mileages using mobile devices. The method 300 may include one or more blocks, routines or functions in the form of computer executable instructions that are stored in a tangible computer-readable medium (e.g., 106 of FIG. 1) and executed using a processor (e.g., 104 of FIG. 1).

The method 300 may be implemented on a mobile device such as the mobile device 102 of FIG. 1. Generally, a user may bring the mobile device to a vehicle (e.g., the vehicle 114 of FIG. 1) when the user decides to take a trip by driving the vehicle from one location to another. The trip starts when the user turns on the vehicle and finishes when the user shuts off the vehicle.

The method 300 begins by setting up trip categorization rules (block 302). In an embodiment, the method 300 may receive a set of trip categorization rules configured by the user. The set of trip categorization rules may specify how the method 300 can automatically categorize a given trip and store tracked mileages accordingly. For example, the set of trip categorization rules may define a set of working hours in a work day. Thus, if the user takes a trip during the set of working hours, then the trip may be categorized as a business trip. Accordingly, mileages tracked for the business trip may correspond to business miles. On the other hand, if the user takes a trip outside the set of working hours, then the trip may be categorized as a personal trip. Accordingly, mileages tracked for the personal trip may correspond to personal miles.

Next, based on the trip categorization rules, the method 300 may define a trip type for a current trip in order to begin automatic mileage tracking (block 304). For example, the user may decide to take the current trip during the set of working hours, and as such, the current trip may be categorized as a business trip.

The method 300 may then establish a connection between the mobile device and the vehicle (block 306). In particular, after the user turns on the vehicle, the method 300 may connect the mobile device to the vehicle. The connection between the mobile device and the vehicle may be established using short range wireless communication such as Bluetooth, for example. Using Bluetooth, the vehicle may transmit a unique identification number associated with the vehicle to the mobile device. Upon receiving the unique identification number, the mobile device may compare the unique identification number to a list of identification numbers stored in the mobile device. If a match is found, then the mobile device may identify and connect to the vehicle. Additionally or alternatively, the user may manually connect the mobile device to the vehicle by selecting an identification number associated with the vehicle from the list of identification numbers.

Once connected, the method 300 may proceed to execute mileage tracking (block 308). To do so, the mobile device may transmit signals periodically to locate the position of the mobile device and hence the position of the vehicle connected to the mobile device. The mobile device may perform this location detection by using GPS, for example. The method 300 may track changes in the position of the mobile device in order to determine the total amount of miles driven by the vehicle. Specifically, each transmitted signal is logged and stored in a memory of the mobile device (e.g., the memory 106 of FIG. 1). The mobile device may sum up the distance between each signal to calculate a total distance or total number of miles driven for the current trip.

During the current trip, the method 300 may receive inputs from the user to split the current trip (block 310). Splitting the current trip entails that the method 300 ends mileage tracking on the current trip and assigns a different trip type to a new trip in order to begin mileage tracking on the new trip. For example, the user may wish to take a detour trip for personal reasons. As such, the method 300 may receive an input from the user indicating that the current business trip is to be split into a new personal trip.

If the method 300 determines that the user wishes to split the current trip, the method 300 proceeds to save all currently tracked mileages (block 312). The method 300 may store the currently tracked mileages as business miles.

The method 300 then proceeds to change the trip type to begin mileage tracking on the new personal trip (block 314). Accordingly, the method 300 returns to the block 308 to execute mileage tracking for the new personal trip. The method 300 may store mileages tracked for the new personal trip as personal miles.

If the method 300 determines that the user does not wish to split the current trip, the method 300 may determine if the current trip has ended (block 316). The current trip may end when the user shuts off the vehicle. Once the user shuts off the vehicle, the connection between the mobile device and the vehicle is terminated. If the current trip has not ended, then the method 300 may return to the block 308.

On the other hand, if the current trip has ended, the method 300 proceeds to save all tracked mileages for the current trip (block 318).

Afterward, the method 300 may display saved mileage information for the current trip (block 320). In particular, the method 300 may display the total mileage incurred for the current trip, along with information such as the date of the current trip and the duration of the current trip. Further, the method 300 may display a map showing the route taken by the current trip from start to finish. The method 300 may display the mileage information via a user interface (e.g., the user interface 108 of FIG. 1) of the mobile device, for example.

Finally, the method 300 may submit the tracked mileages for the current trip (block 322). In an embodiment, the method 300 may receive an input from the user indicating that the tracked mileages for the current trip are to be submitted. As such, the method 300 may transmit the tracked mileages for the current trip to an external database. The method 300 may also activate a reminder alarm to remind the user to submit the tracked mileages. In some embodiments, the method 300 may automatically submit the tracked mileages for the current trip.

Using the system 100 and the method 300, driving mileages may be automatically tracked using mobile devices. Potential applications for such systems and methods are not limited to the field of tax or expense reporting. Applications in other fields or industries may include tracking mileages for vehicle insurance purposes, tracking mileages for vehicle or fleet maintenance purposes, tracking mileages for personal reasons such as during vacations, etc.

Figure 4:
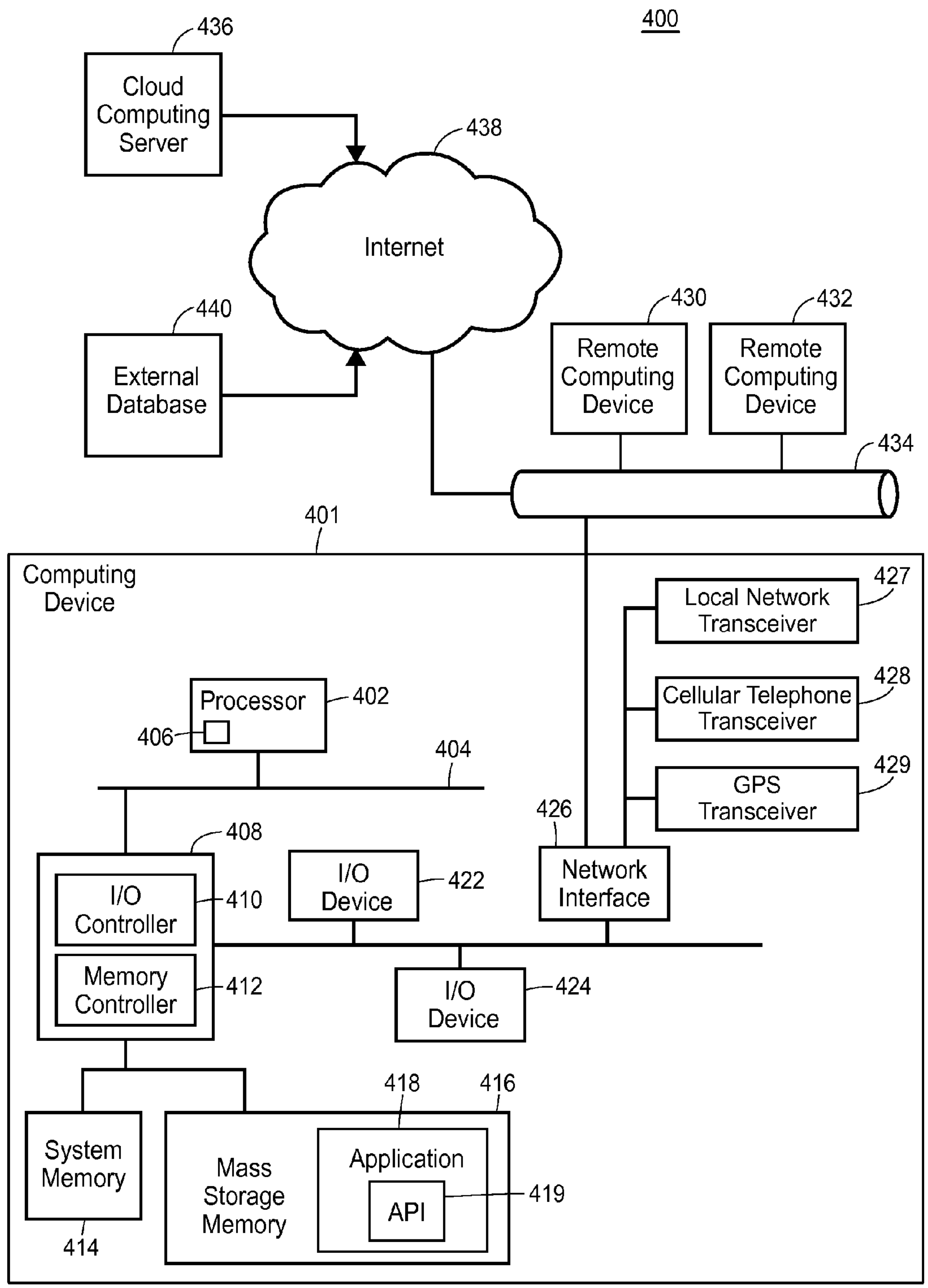
FIG. 4 is a block diagram of a computing environment that implements a system and method for automatically tracking driving mileages using mobile devices.

FIG. 4 is a block diagram of an example computing environment for a system 400 having a computing device 401 that may be used to implement the systems and methods described herein. The computing device 401 may include a mobile computing device (e.g., smart phone, cellular phone, a tablet computer, a Wi-Fi-enabled device, etc.), or other known type of mobile computing device. As will be recognized by one skilled in the art, in light of the disclosure and teachings herein, other types of mobile computing devices can be used that have different architectures. Processor systems similar or identical to the example system 400 may be used to implement and execute the example system of FIG. 1, the method of FIG. 3, and the like. Although the system 400 is described below as including a plurality of peripherals, interfaces, chips, memories, etc., one or more of those elements may be omitted from other example processor systems used to implement and execute the example system 100. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement an application 418 having an API 419 (including functions and instructions as described by the method 300 of FIG. 3). The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 400. Thus, a module, block, function, operation, procedure, routine, step, and method can be implemented in hardware, firmware, and/or software. In one embodiment, program modules and routines (e.g., the application 418, the API 419, etc.) are stored in mass storage memory 416, loaded into system memory 414, and executed by a processor 402 or can be provided from computer program products that are stored in tangible computer-readable storage mediums (e.g., RAM, hard disk, optical/magnetic media, etc.).

The peripheral I/O controller 410 performs functions that enable the processor 402 to communicate with peripheral input/output (I/O) devices 422 and 424, a network interface 426, a local network transceiver 427, a cellular network transceiver 428, and a GPS transceiver 429 via the network interface 426. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 428 may be resident with the local network transceiver 427. The local network transceiver 427 may include support for a Wi-Fi network, Bluetooth, infrared or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the application 418 on remote computing devices 430 and 432. The remote computing devices 430 and 432 may communicate with the computing device 401 over an Ethernet link 434. In some embodiments, the application 418 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. Further, the application 418 may be adapted to execute in a web-browser using JavaScript. In some embodiments, the application 418 may communicate with a backend component 440 such as the external database 122 via the Internet 438.

The system 400 may include but is not limited to any combination of a LAN, a MAN, a WAN, a mobile, a wired or wireless network, a private network, or a virtual private network. Moreover, while only two remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for automatically tracking driving mileages using mobile devices for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for automatically tracking driving mileages using mobile devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for automatic mileage tracking using a mobile device, the method comprising:

configuring, by one or more processors of the mobile device, a set of trip categorization rules;

defining, by one or more processors of the mobile device, a trip type for a current trip based on the set of trip categorization rules;

establishing, by one or more processors of the mobile device, a wireless connection between the mobile device and a vehicle;

in response to establishing the wireless connection between the mobile device and the vehicle, executing, by one or more processors of the mobile device, mileage tracking for the current trip;

upon termination of the wireless connection between the mobile device and the vehicle, storing, by one or more processors of the mobile device, a plurality of tracked mileages from the mileage tracking for the current trip in a memory of the mobile device;

calculating, by one or more processors of the mobile device, a total mileage for the current trip by summing the plurality of tracked mileages; and displaying, by one or more processors of the mobile device, the total mileage for the current trip to a user.

2. The computer-implemented method of claim 1, further comprising:

receiving, by one or more processors of the mobile device, an input from the user indicating the total mileage for the current trip is to be submitted; and submitting, by one or more processors of the mobile device, the total mileage for the current trip by transmitting the total mileage to a remote database.

3. The computer-implemented method of claim 1, wherein the trip type for the current trip comprises one of a business trip, a personal trip, or a personal incidental trip.

4. The computer-implemented method of claim 3, wherein configuring the set of trip categorization rules comprises defining a time period designated for the business trip, a time period designated for the personal trip, and a time period designated for the personal incidental trip.

5. The computer-implemented method of claim 4, wherein defining the trip type for the current trip comprises determining which time period the current trip occurs based on the set of trip categorization rules.

6. The computer-implemented method of claim 1, wherein the wireless connection between the mobile device and the vehicle is established using Bluetooth.

7. The computer-implemented method of claim 1, wherein executing the mileage tracking comprises transmitting a plurality of signals to a location detection system at periodic intervals to determine the position of the mobile device.

8. The computer-implemented method of claim 7, wherein distance between each signal in the plurality of signals corresponds to each tracked mileage in the plurality of tracked mileages.

9. The computer-implemented method of claim 1, further comprising:

receiving, by one or more processors of the mobile device, an input from the user indicating that the current trip is to be split into a new trip;

in response to receiving the input from the user, terminating, by one or more processors of the mobile device, the mileage tracking on the current trip;

storing, by one or more processors of the mobile device, the plurality of tracked mileages for the current trip in the memory of the mobile device;

assigning, by one or more processors of the mobile device, a different trip type for the new trip; and executing, by one or more processors of the mobile device, mileage tracking for the new trip.

10. The computer-implemented method of claim 1, further comprising:

activating, by one or more processors of the mobile device, a reminder alarm to remind the user to submit the total mileage for the current trip.

11. A non-transitory computer-readable storage medium including computer-readable instructions to be executed on one or more processors of a mobile device for automatic mileage tracking, the instructions when executed causing the one or more processors to:

configure a set of trip categorization rules;

define a trip type for a current trip based on the set of trip categorization rules;

establish a wireless connection between the mobile device and a vehicle;

in response to establishing the wireless connection between the mobile device and the vehicle, execute mileage tracking for the current trip;

upon termination of the wireless connection between the mobile device and the vehicle, store a plurality of tracked mileages from the mileage tracking for the current trip in the memory of the mobile device;

calculate a total mileage for the current trip by summing the plurality of tracked mileages; and display the total mileage for the current trip to a user.

12. The non-transitory computer-readable storage medium of claim 11, further comprising instructions that, when executed, cause the one or more processors to:

receive an input from the user indicating the total mileage for the current trip is to be submitted; and submit the total mileage for the current trip by transmitting the total mileage to a remote database.

13. The non-transitory computer-readable storage medium of claim 11, wherein the trip type for the current trip includes one of a business trip, a personal trip, or a personal incidental trip.

14. The non-transitory computer-readable storage medium of claim 13, wherein the instructions to configure the set of trip categorization rules include defining a time period designated for the business trip, a time period designated for the personal trip, and a time period designated for the personal incidental trip.

15. The non-transitory computer-readable storage medium of claim 14, wherein the instructions to define the trip type for the current trip include determining which time period the current trip occurs based on the set of trip categorization rules.

16. The non-transitory computer-readable storage medium of claim 11, wherein instructions to execute the mileage tracking include transmitting a plurality of signals to a location detection system at periodic intervals to determine the position of the mobile device.

17. The non-transitory computer-readable storage medium of claim 16, wherein distance between each signal in the plurality of signals corresponds to each tracked mileage in the plurality of tracked mileages.

18. The non-transitory computer-readable storage medium of claim 11, further comprising instructions that, when executed, cause the one or more processors to:
receive an input from the user indicating that the current trip is to be split into a new trip;
in response to receiving the input from the user, terminate the mileage tracking on the current trip;
store the plurality of tracked mileages for the current trip in the memory of the mobile device;
assign a different trip type for the new trip; and
execute mileage tracking for the new trip.

19. The non-transitory computer-readable storage medium of claim 11, further comprising instructions that when executed cause the one or more processors to:
activate a reminder alarm to remind the user to submit the total mileage for the current trip.

20. A system for automatic mileage tracking using mobile devices, the system comprising:
a mobile device, including a memory having instructions for execution on one or more processors, wherein the instructions, when executed by the one or more processors, cause the mobile device to:
configure a set of trip categorization rules;
define a trip type for a current trip based on the set of trip categorization rules;
establish a wireless connection between the mobile device and a vehicle;
in response to establishing the wireless connection between the mobile device and the vehicle, execute mileage tracking for the current trip;
upon termination of the wireless connection between the mobile device and the vehicle, store a plurality of tracked mileages from the mileage tracking for the current trip in the memory of the mobile device;
calculate a total mileage for the current trip by summing the plurality of tracked mileages; and
display the total mileage for the current trip to a user.

21. The system of claim 20, wherein the instructions of the mobile device, when executed by the one or more processors, further cause the mobile device to:
receive an input from the user indicating the total mileage for the current trip is to be submitted; and
submit the total mileage for the current trip by transmitting the total mileage to a remote database.

22. The system of claim 20, wherein the trip type for the current trip includes one of a business trip, a personal trip, or a personal incidental trip.

23. The system of claim 22, wherein the instructions of the mobile device, when executed by the one or more processors to configure the set of trip categorization rules further include instructions to define a time period designated for the business trip, a time period designated for the personal trip, and a time period designated for the personal incidental trip.

24. The system of claim 23, wherein the instructions of the mobile device, when executed by the one or more processors to define the trip type for the current trip further include instructions to determine which time period the current trip occurs based on the set of trip categorization rules.

25. The system of claim 20, wherein the instructions of the mobile device, when executed by the one or more processors, further cause the mobile device to:
receive an input from the user indicating that the current trip is to be split into a new trip;
in response to receiving the input from the user, terminate the mileage tracking on the current trip;
store the plurality of tracked mileages for the current trip in the memory of the mobile device;
assign a different trip type for the new trip; and
execute mileage tracking for the new trip.

* * * * *